Dec. 10, 1963
M. FINGEROOT
3,113,704
PRESSURIZED DISPENSING ASSEMBLY FOR
A WINDSHIELD WASHER SYSTEM
Filed Oct. 26, 1962
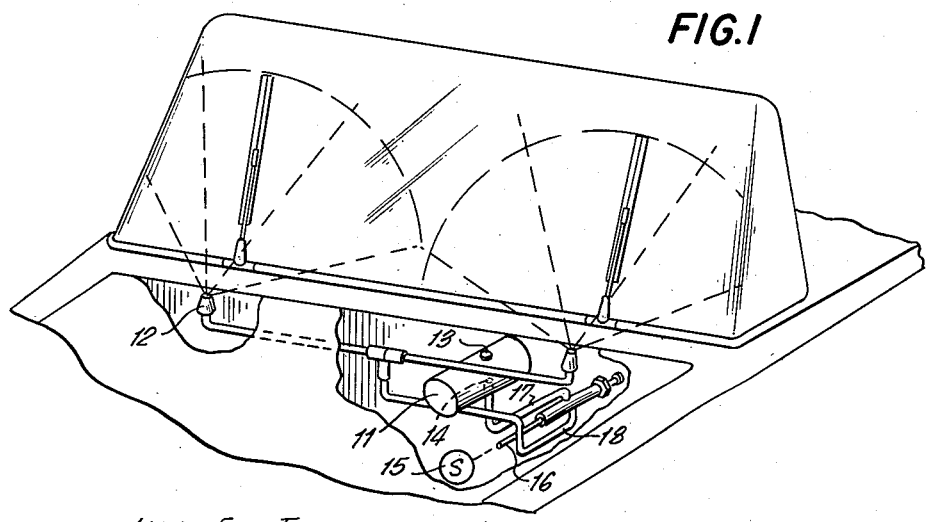
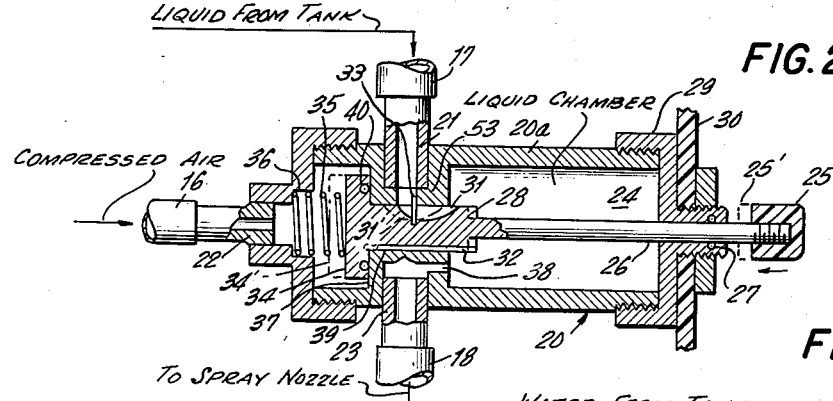
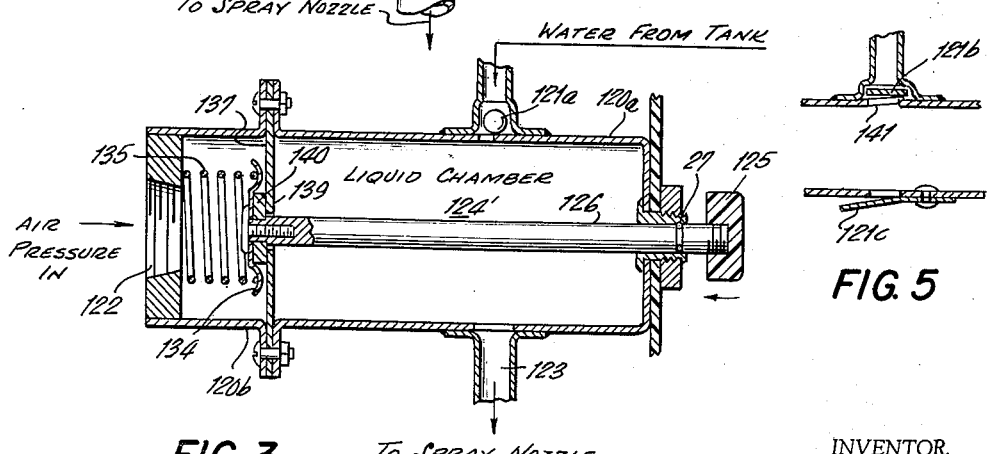
INVENTOR.
MAX FINGEROOT
BY
*Brisbin & Goldfarb*
ATTORNEYS

United States Patent Office 3,113,704
Patented Dec. 10, 1963

3,113,704
PRESSURIZED DISPENSING ASSEMBLY FOR A
WINDSHIELD WASHER SYSTEM
Max Fingeroot, 23540 Moritz Ave., Oak Park, Mich.
Filed Oct. 26, 1962, Ser. No. 233,402
4 Claims. (Cl. 222—373)

This invention relates to a windshield washer system for automotive vehicles, and more particularly to a gravity-fed push-button valve employable in combination with such a system.

An illustrative arrangement of the invention features a windshield washer system which releases a predetermined volume of washing or defrosting liquid instantly as a high pressure spray application onto the windshield when manual pressure is applied to a control button of the valve. The valve has a storage chamber and release of the control button causes this storage chamber to become filled with liquid for the next spray application. Among other features, the arrangement of the invention provides a source of pressure which is independent of the vacuum system of the vehicle engine and thus can be operated while the engine is shut off. Other features are simplicity of design contributing to low cost manufacture, and reliable operation with very little maintenance, under all weather conditions, in spite of high cross winds which tend to divert sprays of lower pressure.

Windshield washers are known which produce a jet stream of water of relatively short duration directed onto the windshield wherein the pressure for producing the jet is derived from the vehicle engine, from $CO_2$ gas cartridges, or from other sources of compressed air or gas connected with a fluid-storage tank which holds the liquid. However, these prior-art devices have a number of disadvantages, one of which is that the entire fluid-storage tank must first be placed under pressure before any of the liquid will be delivered. This involves a waste of the pressurizing gas and a time delay between application of the gas pressure or actuation of the control valve to release the spray, and delivery of the fluid to the windshield.

Furthermore, in these known devices the supply tank of liquid is connected between the actuating valve and the source of pressure. This requires that the tank itself be sufficiently gas-tight at the operating pressures, and consequently is often a source of leaks which result in malfunction of the system. Moreover, such arrangement is inconvenient when filling the storage tank, since the air or gas pressure must first be released from the tank, and thus wasted, to open the latter for pouring in liquid. Because of the requirement that the tank be pressure-tight, the prior art devices of this type are customarily designed to operate at relatively low pressures, for example below 25 p.s.i. not only to help avoid difficulties arising from leaks in the system but also for reasons of safety to personnel when the tank is opened to replenish the liquid. Operation at low pressures, however, often does not assure adequate coverage by the spray or jet of the desired windshield area, especially under adverse weather conditions when driving through cross winds.

In the prior art, furthermore, the control valves usually function by opening and closing off the air or gas line leading from the source of pressure, rather than directly controlling the flow of liquid. Such indirect control has the disadvantages of time-delay and less accurate control of quantity. Also, in the prior art devices where a volume of air or gas under pressure is stored above the liquid to force the liquid out of the tank, the tank container must be of a capacity larger than that necessary to merely store the supply of liquid.

It is therefore a primary object of this invention to provide a windshield washer system having an instantaneous liquid spray action to release a predetermined volume of liquid onto an area of the windshield larger than that traversed by the windshield wiper blades, the spray action being initiated instantly upon depression of a control valve button; release of the button causing an automatic recharge of the valve with a volume of liquid for the next spray application.

Another object of this invention is to provide a vehicle windshield washer system which is independent of the engine vacuum or exhaust system for its operation, and which can therefore be operated, for example to melt ice on the windshield, when the vehicle and engine are at a standstill, even before the windshield wiper blades begin reciprocating.

A further object of the invention is to provide a pressurized windshield spray and washer system in which the liquid supply tank can be maintained at substantially atmospheric pressure and is therefore convenient and safe to fill with washing or defrosting liquid.

It is another object of the invention to provide a windshield washer apparatus for vehicles which will spray a measured amount of liquid at relatively high pressure under adverse weather and all driving conditions onto a given windshield area.

A further object of the invention is to provide a novel valve for spray apparatus which will deliver a predetermined quantity of liquid for each spray application.

To these ends, and in accordance with the present invention, a valve of novel construction is connected in the system between a gravity-fed liquid supply at atmospheric pressure and a source of compressed air or other gas under super-atmospheric pressure. The valve is preferably positioned at a level below the tank which forms the source of liquid so that the liquid can flow by gravity into a measuring chamber of the valve when a spring-biased control rod of the valve is in a predetermined position. Manual pressure on the valve control rod to shift it against the spring force opens valve ports to introduce gas into the valve from the pressure source so as to force the measured volum of liquid out of the valve measuring chamber and through a conduit directly connected to the spray nozzle.

The spray system of the present invention is particularly suitable for use at pressures of 75 to 100 lbs. per sq. inch, on highway trucks and other vehicles of the type which normally produce or have available compressed air in reserve tanks for other purposes, such as for operating air brakes. Such compressed air tanks can readily be tapped to provide the required source of gas under pressure for operating the valve and windshield washer system of the invention.

The foregoing and more specific features of the invention will be explained in the following with reference to the embodiments illustrated by way of example on the accompanying drawings, the essential features of my invention being set forth with particularity in the claims annexed hereto.

In the drawings:

FIG. 1 is a fragmentary perspective view showing the general arrangement of the novel system relative to the windshield of an automotive vehicle;

FIG. 2 is an enlarged detail in longitudinal section of one embodiment of the valve of FIG. 1.

FIG. 3 is an enlarged detail in longitudinal section of another embodiment of the valve; and FIGS. 4 and 5 show in cross section details of alternate check valves which may be used in the embodiment of FIG. 3.

As shown in FIG. 1, the device is provided with a tank 11 for holding a supply of water or other cleaning or defrosting liquid. The tank 11 is preferably mounted in a suitable manner under the forward hood of the vehicle. The liquid to be contained in the tank may be composed of water, a solvent or detergent-type cleaning solution, or an aqueous de-icing fluid, containing, for example, glycerine, alcohol or diethylene glycol. Suitable fittings 13, 14 are provided on the tank 11 for filling it with the liquid and for connection to the system. The tank is preferably adapted to hold the liquid at atmospheric pressure so that no space for air need be reserved above the liquid level in tank 11, and no special pressure-relief features need be provided for exhausting pressure from tank 11 before removing fitting 13.

A suitable source 15 of compressed air or gas, such as from a $CO_2$ cartridge or from a compressed air tank carried by the vehicle, is connected by means of a pressure line 16 to one end of a valve 20. Pressure from source 15 should be sufficiently high, for example 75 to 100 lbs. per sq. inch, so as to vaporize or disintegrate the liquid at the spray nozzle into a fine mist and thus obtain more economical dispersion of the liquid over the windshield.

The source 15 can be a compressed air tank adapted to be replenished from a compressor (not shown) carried by the vehicle itself, or replenished from a conventional service-station air-compressor hose through a Shrader valve such as is commonly used for filling pneumatic tires.

The tank outlet fitting 14 is fixed to the bottom of the tank 11, below the water level, and is connected to a conduit, such as a copper tube 17, the other end of which is connected to the liquid intake 21 located in the upper portion of the control valve 20. The valve 20 is mounted on the dash board or control panel 30 of the vehicle.

The tank 11 is mounted at a level higher than the valve 20 so as to feed liquid to the latter by gravity. One or more spray nozzles 12, fastened to the forward hood of the vehicle, are connected by a conduit 18 to an outlet 23 located in the bottom portion of the valve 20.

The valve 20 itself, as best shown in the illustrative embodiment of FIG. 2, comprises a housing 20a provided with an end wall 53 and an inlet 21 at the top of end wall 53 for liquid from conduit 17 which is attached to inlet 21. Another inlet 22 is provided in housing 20a for compressed air or gas from conduit 16 which is connected to inlet 22. An outlet 23 is provided in housing 20a for ejecting liquid through conduit 18 to the spray nozzle 12. The housing defines a chamber 24 of sufficient volume to contain enough liquid for one spray application. A longitudinal control rod 26 is slidably mounted within the housing 20a and longitudinally traverses the chamber. The rod 26 is controlled by a push button 25 and spring-biased by means of a spring 35 toward the right as viewed in FIG. 2. A stationary O-ring seal 27 is provided around the rod 26 and recessed into an end fitting 29 forming part of the housing 20a. The fitting 29 is adapted to pass through the vehicle instrument panel 30 for mounting the valve thereon.

An intermediate or piston portion 28 of the rod 26 is of enlarged diameter. This piston is mounted so as to slide within a bore 39 of the housing and is provided with a recess 31 so located in relation to the liquid inlet 21 that it passes liquid therefrom into chamber 24 when the rod is in the solid-line position shown in FIG. 2, but shuts off the flow of liquid therefrom when the button 25 is pressed to move rod 26 to the left until the recess assumes the dash-dot line position 31'. A pin 33, fixedly inserted into the enlarged shaft portion 28 and engaging the inlet opening 21 limits axial movement of the shaft 26, prevents rotation of the shaft 26 and movement of recess 31 away from the opening 21. Also located in the enlarged rod portion 28, and opposite the recess 31, is a groove 32 for introducing compressed air or gas into chamber 24 to exhaust the latter through passage 38 of the housing into the outlet 23. In the position shown in FIG. 2 of rod 26, its portion 28 and groove 32, no compressed air can flow from inlet 22 through groove 32 because the left end of the groove 32 is located to the right of transverse wall 37 and sealingly engages the smooth wall of bore 39. The left end of enlarged rod portion 28 is flared out to form a disc 34 having a surface for engaging spring 35, which is axially centered in a recess 36 of the housing. An O-ring 40 is recessed in the right-hand face of disc 34 so as to bear against the wall 37 of the housing when the rod 26 is biased toward the right by spring 35 and by pressure from inlet 22.

The valve of FIG. 2 operates as follows. In the position illustrated, liquid flows by gravity from the tank 11 into conduit 17, through inlet 21, through recess 31 and into the chamber 24 and fills the latter. Pressure on push-button 25 moves it to position 25' and shifts the recess 31 into position 31', thus closing off the liquid inlet. Simultaneously, the rod portion 34 is shifted to the left to position 34', leaving a gap between disc 34 and the transverse wall 37 around which compressed air or gas flows from the source of pressure 15, through conduit 16, around disc 34, through groove 32 and into the chamber 24. The entering gas under pressure causes the liquid to be expelled from the chamber 24 through the outlet passage 38, through the outlet 23, the conduit 18, to the nozzles 12 from which it is sprayed at a pressure of 75 to 100 p.s.i. onto the windshield. The high pressure of the air or gas serves to atomize the sprayed liquid and distribute it over the entire windshield area.

FIG. 3 illustrates another embodiment of the valve, constructed so as to have a housing 20b made of sheet metal. The shaft 126, instead of having an enlarged intermediate portion as in FIG. 2, is of uniform diameter, with the push-button 25 on one end and a disc 134 at the other end. The disc 134 has a curved circular recess for receiving the spring 135 which urges the disc 134, with the rod 126 attached thereto, toward the right as viewed in FIG. 3. The housing is made in two parts 120a, 120b, with a transverse wall 137 securely fastened between abutting flanges of the two housing portions. A central bore 139 is provided in the wall 137 through which the rod 126 passes, and a sealing member 140 of resilient material is provided around the shaft 126 and carried thereby to form a seal around the bore 139 and the disc 140.

Instead of the valve portions 31, 32 as in FIG. 2, the embodiment of FIG. 3 is provided with a check valve inlet 121 which is normally open to allow fluid to flow downwardly by gravity from the storage tank 11 past the check ball 121a into the liquid chamber 124. Instead of ball 121a, other check valves may also be used, for example a disc 121b (FIG. 4), or a spring plate 121c (FIG. 5). The holes 141 in FIGS. 3 and 4 are both tilted and off-center relative to the ball 121a or disc 121b so that they will not be closed off by the weight of the ball or disc even when pressed downward by fluid above. However, the openings above the ball 121a (FIG. 3) or the disc 121b (FIG. 4) are coaxial with the closure elements 121a or 121b, so that when the latter are moved upwardly by super-atmospheric pressure from the chamber 124, positive sealing of the check-valve takes place. The check-valve spring 121c of FIG. 5 operates in a similar manner.

The valve in the embodiment of FIG. 3 operates as follows:

In the position illustrated in FIG. 2, fluid flows by gravity through the check valve, past ball 121a, through the opening 141 and into the chamber 124. When the push button 125 is pushed toward the left against the force of spring 135, it moves rod 126 axially together with resilient seal 140 and disc member 134 fastened to the rod. Bore 139 is thus uncovered and compressed air or gas enters through inlet 122, passes around disc 134 and seal 140, through open bore 139 and into the liquid chamber 124, forcing the fluid out of the chamber through outlet 123. The increase in pressure within chamber 124 closes off check valve 121a so that no fluid or gas can back up into tank 11.

Although I have described my novel valve in operation with a windshield washer system, it can also be used in supplying measured amounts of liquid under pressure to spray equipment of other types, such as in painting or lubricating.

It will be obvious to those skilled in the art, upon a study of this disclosure, that this invention permits of various modifications and alterations with respect to the individual components and arrangements disclosed, and hence can be embodied in equipment other than as particularly illustrated and described herein, without departing from the essential features of the invention and within the spirit and scope of the claims annexed hereto.

I claim:

1. A pressurized dispensing assembly for a windshield washer system comprising a housing having end walls defining a fluid receiving chamber, a plunger axially movable through said end walls and extending through said chamber, gravity fed one way delivery means for supplying liquid into said chamber, one of said end walls having a bore therein, said plunger having an enlarged piston portion slidable in said bore spring pressed sealing means on said plunger normally engaging said one end wall for closing said bore, means connected to said housing for supplying fluid under pressure through said bore when said sealing means is out of engagement with said one end wall, said piston portion having a recess therein for communicating said delivery means with said chamber when said sealing means is out of engagement with said one end wall, and means connected to said housing for delivering atomized fluid from said housing for application on a windshield.

2. A pressurized assembly according to claim 1 including means engaging said housing and carried by said piston for limiting movement of said plunger and preventing rotation thereof.

3. A pressurized dispensing assembly according to claim 1 wherein said sealing means includes a head on said piston, an O ring seal on said head yieldingly engaging said one end wall, and a spring engaging said head or urging said head to a position where said O ring engages said one end wall.

4. A pressurized dispensing assembly for a windshield washer system comprising a housing having end walls defining a fluid receiving chamber, a plunger axially movable through said end walls and extending through said chamber, gravity fed means provided with a check valve for supplying liquid into said chamber, one of said end walls having a bore therein, resilient sealing means on said plunger normally engaging said one end wall for closing said bore, a disk on said plunger, spring means engaging said disk for urging said sealing means against said one end wall means connected to said housing for supplying fluid under pressure through said bore when said sealing means is out of engagement with said one end wall, and means connected to said housing for delivering atomized fluid from said housing for application on a windshield.

References Cited in the file of this patent

UNITED STATES PATENTS

| | | |
|---|---|---|
| 1,461,960 | Bastian | July 17, 1923 |
| 1,792,513 | Soreny | Feb. 17, 1931 |
| 2,216,890 | Phillips | Oct. 8, 1940 |
| 2,579,909 | Dieffenbach | Dec. 25, 1951 |
| 2,807,393 | Metrailer et al. | Sept. 24, 1957 |